(12) United States Patent
Roberts et al.

(10) Patent No.: US 6,670,906 B1
(45) Date of Patent: Dec. 30, 2003

(54) METHOD FOR DETERMINING ACCURATELY COORDINATES OF A GPR ANTENNA RELATIVE TO A FIXED REFERENCE

(75) Inventors: Roger Roberts, Amesbury, MA (US); Alan E. Schutz, Newburyport, MA (US)

(73) Assignee: Geophysical Survey Systems, Inc., North Salem, NH (US)

( * ) Notice: Subject to any disclaimer, the term of this patent is extended or adjusted under 35 U.S.C. 154(b) by 0 days.

(21) Appl. No.: 09/988,570

(22) Filed: Nov. 20, 2001

Related U.S. Application Data (60) Provisional application No. 60/252,002, filed on Nov. 20, 2000.

(51) Int. Cl.[7] .............................................. G01S 13/00
(52) U.S. Cl. ...................................... 342/22; 367/907
(58) Field of Search .......................... 342/22, 453, 450; 367/907

(56) References Cited

U.S. PATENT DOCUMENTS

| | | | |
|---|---|---|---|
| 3,831,173 A | * 8/1974 | Lerner | .......................... 342/22 |
| 4,706,031 A | * 11/1987 | Michiguchi et al. | .......... 342/22 |
| 5,900,833 A | * 5/1999 | Sunlin et al. | .................. 342/22 |

* cited by examiner

Primary Examiner—Ian J. Lobo
(74) Attorney, Agent, or Firm—Wolf, Greenfield & Sacks, P.C.

(57) ABSTRACT

A method and apparatus for determining accurately a coordinate of a transmitting/receiving antenna pair relative to a predetermined reference position. The method includes placing a transmitting antenna in proximity to a reflective strip, transmitting a first signal from the transmitting antenna and detecting a reflection of the first signal received from the reflective strip at the receiving antenna located at a fixed distance from the transmitting antenna. The method further comprises determining a coordinate of the antennas relative to the reflective strip based on a parameter of the reflection. The method may further comprise detecting a second signal received by the receiving antenna from a conductive strip located proximate to the reflective strip, and determining a second coordinate of the antennas based at least on a time difference between transmitting the first signal from the transmitting antenna and receiving the second signal at the receiving antenna.

25 Claims, 6 Drawing Sheets

METHOD FOR DETERMINING ACCURATELY COORDINATES OF A GPR ANTENNA RELATIVE TO A FIXED REFERENCE

RELATED APPLICATIONS

This application claims priority under 35 U.S.C. §119(e) to commonly-owned, co-pending U.S. Provisional Patent Application Ser. No. 60/252,002 entitled, "METHOD FOR ACCURATELY DETERMINING CARTESIAN COORDINATES OF A GPR ANTENNA RELATIVE TO A FIXED REFERENCE," filed Nov. 20, 2000, which is hereby incorporated by reference in it's entirety.

FIELD OF THE INVENTION

The present invention is directed toward a method and apparatus for accurately determining a coordinate of an antenna relative to a predetermined reference location, in particular an antenna for ground penetrating radar.

BACKGROUND

Ground penetrating radar ("GPR") systems are used to obtain measurements of subsurface structures and provide images of the internal structure of opaque materials such as soil, rock, concrete, asphalt and wood.

Most GPR equipment utilizes time-domain methods to penetrate a medium. This typically entails generation and radiation of short electromagnetic pulses in a range of 10 MHz to 2 GHz. The radiated pulses propagate from a system's radar transmitter and transmitting antenna, penetrate the subsurface medium, and reflect, refract and/or diffract at boundaries of intrinsic impedance contrasts, commonly referred to as targets, in the subsurface medium. A portion of the redirected energy propagates back to a receiving antenna, where the energy may be processed, displayed and stored. In this manner, a time versus distance map of a series of measurements over the medium surface can be constructed to provide a cross-sectional image of targets within the medium. Data is often collected along a series of parallel lines to yield a 3-D image of reflectors (targets) in the subsurface medium. The quality of the 3-D image is directly correlated to the accuracy of the (x,y) coordinates of the parallel profile lines.

A conventional method for collecting data along parallel profile lines and demarcating the starting and ending (x,y) coordinates of each profile line is to position the antenna on a grid and move the antenna along each line on the grid. Typically the starting point of each parallel line is indicated by a user-generated mark in the data or by separating the data from each profile line into separate data files. Both methods rely on the user to accurately position the antenna on the starting point of each profile line and to record the (x,y) coordinate of the starting point of each line.

Generally it is desired that the user will traverse along a straight line so that the ending y-coordinate is the same as the starting y-coordinate. However, this is not always the case, particularly if the area being surveyed is large and there is thus a large distance between the beginning and end of a line.

A distance encoder, such as a meter wheel, is often used to record the distance the antennas have traveled and the length of a profile line. If the surface of the area being surveyed is uneven, the wheel may (and often will) skip, thus introducing errors into the distance measurement. In applications where centimeter-level accuracy in the position of the antennas is important, such errors in the distance measurement may be unacceptable. Also, it is often undesirable to rely on the radar operator to position the antennas accurately and to record these positions since there is a likelihood of operator error, particularly when a very high level of positioning accuracy is required and in any event such efforts increase the time involved to successfully collect the data.

There is, accordingly, a need for a method for determining the position of a GPR antenna with high accuracy over a large surface area. Probably such a method would be efficient to employ and require apparatus which is inexpensive and simple to deploy and use.

SUMMARY OF THE INVENTION

The foregoing and other needs are addressed by, and advantages accrued from, the new method and apparatus disclosed herein.

According to one embodiment, such a method for determining a coordinate of an antenna relative to a predetermined reference comprises acts of placing transmitting and receiving antennas in proximity to a reflective strip, transmitting a first signal from the transmitting antenna and detecting a reflection of the first signal received by the receiving antenna from the reflective strip. The method further comprises determining a coordinate of at least one of the receiving antenna and the transmitting antenna relative to the reflective strip based on a parameter of the reflection.

The method may further comprise acts of detecting a second signal received by the receiving antenna from a conductive strip located proximate to the reflective strip, and determining a second coordinate of at least one of the receiving antenna and the transmitting antenna based at least on a time difference between transmitting the first signal from the transmitting antenna and receiving the second signal at the receiving antenna.

Another embodiment is directed toward a method for determining a coordinate pair of an antenna relative to a predetermined reference, the method comprising acts of placing the antenna proximate to a structure including first and second conductive strips located on either side of a reflective strip, transmitting a first signal from the antenna, and measuring at least one parameter of a second signal received by the antenna, the second signal corresponding to a reflection of the first signal by the reflective strip. The method further comprises transmitting a third signal from the antenna to the first conductive strip, measuring at least one parameter of the third signal received by the antenna from the second conductive strip, and determining an first coordinate of the antenna based on a measurement of the at least one parameter of the second signal. The method also includes determining a second coordinate of the antenna based on a measurement of the at least one parameter of the third signal.

According to another embodiment, there is provided an apparatus for determining a coordinate of an antenna relative to a predetermined reference. The apparatus comprises a transmitting antenna that transmits a signal, a reflective strip that reflects at least a portion of the signal transmitted by the transmitting antenna, and a receiving antenna that receives a reflected signal from the reflective strip. The apparatus also includes a controller, coupled to the receiving antenna, that measures at least one parameter of the reflected signal and determines the coordinate of at least one of the transmitting antenna and the receiving antenna based on a measurement of the parameter.

In one example, the apparatus may further comprise a conductive strip(s) substantially surrounding the reflective strip. The controller may be adapted to measure at least one parameter of a second signal received from the conductive strip by the receiving antenna, the second signal corresponding to at least a portion of the signal transmitted by the transmitting antenna that travels along the conductive strip. The controller may be further adapted to determine a second coordinate of at least one of the transmitting antenna and the receiving antenna based on a measurement of the at least one parameter of a second signal.

According to yet another embodiment, a system that provides an image of a subsurface area comprises a control unit and an antenna, coupled to the control unit, that transmits signals into a medium and receives reflected signals from the medium, the antenna being moved over the area in parallel lines to provide scans of radar data of the area. The system also includes a reflective strip(s) that reflects at least a portion of a signal transmitted by the antenna to provide a reflected signal. The control unit utilizes at least a portion of the reflected signal received by the antenna to provide an accurate position of the antenna in one dimension, the position being used to align successive scans of radar data to provide the image.

The system may further include a conductive strip, wherein the antenna transmits a signal that propagates on the conductive strip and a portion of the signal is received by the antenna after a time interval. The control unit may determine a position of the antenna in a second dimension based on the time interval.

The transmitting and receiving antennas for any of the above embodiments may be provided as a single antenna that performs both functions.

BRIEF DESCRIPTION OF THE DRAWINGS

In the Figures, in which like reference characters represent like elements.

DETAILED DESCRIPTION

Various illustrative embodiments, and aspects thereof, will now be described in detail with reference to the accompanying Figures.

Figure 1:
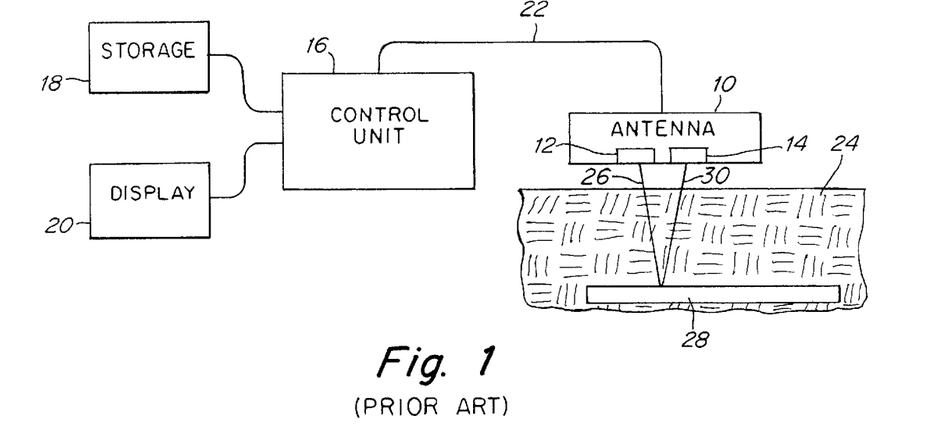
FIG. 1 is a block diagram of one example of a GPR system.

Referring to FIG. 1, there is illustrated a typical ground penetrating radar (GPR) system. The illustrated system comprises an antenna module 10 including a transmitting antenna 12 and a receiving antenna 14. The antenna module 10 is coupled to a control unit 16 which may send control signals, including a transmit pulse, to the antenna module and receive signals from the antenna module. Control unit 16 is coupled to a storage device, 18 and a display device 20. It is to be appreciated that while control unit 16, storage device 18 and display device 20 are illustrated as discrete units in this example, they may be provided as a single integrated element, such as, for example, a personal computer, or in some other arrangement.

The control unit 16 generates a signal, typically a pulse signal, which is transmitted to the antenna module via, for example, a cable 22. The signal 26 may be transmitted by transmitting antenna 12, and penetrates a medium 24 where it may be reflected by a subsurface target 28. Target 28 may be any object that has a propagation constant different from that of the surrounding medium, and which thus causes at least a partial reflection of a signal propagating through the medium. Some example of targets include a metal object, a pipe, a body of water, etc. The reflected signal 30 propagates back from target 28, through medium 24, and may be received by receiving antenna 14. Control unit 16 may receive the reflected signal 30 from antenna module 10 via, for example, cable 22, and may store (using storage device 18) and/or display (using display device 20) information derived from the reflected signal 30 or characteristics of the reflected signal 30, such as, for example, amplitude, time duration, center frequency, or frequency distribution of the reflected signal. Control unit 16 may derive information about target 28 from measured characteristics of reflected signal 30.

Figure 2:
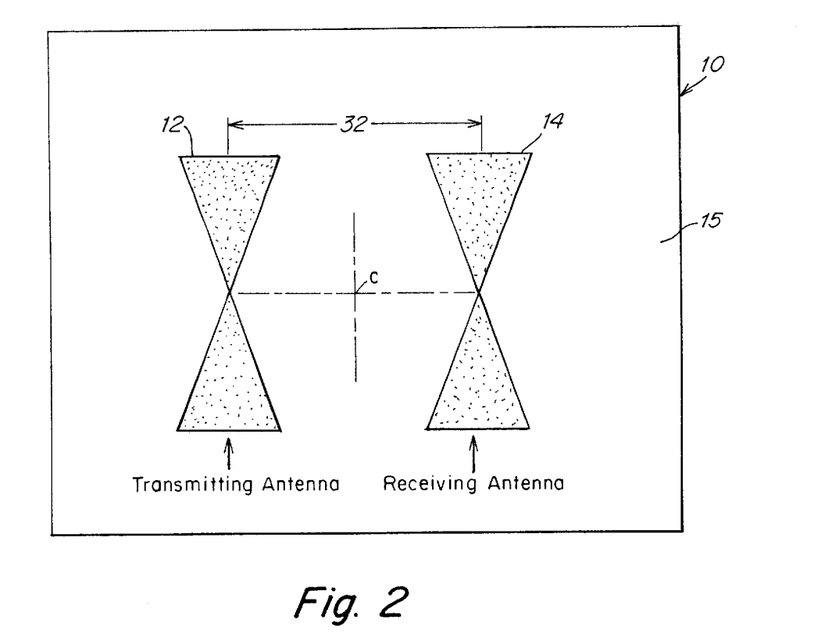
FIG. 2 is a diagrammatic illustration of a top view of an example of an antenna module useful in the GPR system described herein.

FIG. 2 illustrates one example of an antenna module 10 including a transmitting antenna 12 and a receiving antenna 14. While these antennas are illustrated in FIG. 2 as printed bow tie antennas (e.g., copper areas on a printed circuit board phenolic substrate 15), this is merely one example, and is not intended to be limiting. It may be desirable for antenna module 10 to be able to transmit and receive fast rise-time pulse signals and therefore to be wide-band, non-dispersive antennas. However, these and other requirements for the antennas may be application-specific, and the method and apparatus described herein may be implemented with any suitable GPR antennas, including a single antenna serving both the transmit and receive functions.

According to the illustrated example, transmitting antenna 12 and receiving antenna 14 are placed substantially parallel to one another, separated by a center-to-center distance 32. Separation distance 32 may be between approximately one-quarter wavelength and one wavelength at a center operating frequency of the antennas. In most applications, separation distance 32 should not exceed one wavelength as this may result in aliasing of the received signal, which could degrade the quality of the information received. A separation distance 32 of less than one-quarter wavelength may also result in a poor quality received signal due to a decrease in the signal-to-noise ratio of the reflected signal caused by high levels of coupling between the transmitting and receiving antennas. However, in some applications, or using some particular antennas, a smaller separation distance 32 may be acceptable, or even desirable. According to another example, the antenna module 10 may be provided with a single antenna that serves as both the transmitting and receiving antenna.

In many applications, it may be desirable to know the position of transmitting antenna 12 and/or receiving antenna 14 accurately. In some uses, accurate absolute position is needed. In other uses, it is sufficient, or sometimes more important, that an accurate relative position be achieved. For example, when a three-dimensional image of subsurface conditions is to be assembled from multiple, parallel traverses of a plot by the antenna module, it is required that locations along the scan lines be positionally correlated from line to line, and not offset in a forward or backward direction. In such situations, it suffices that the antenna module location be known relative to a known reference location so that, in turn, the location of target 28 may be determined accurately with respect to the reference location. We thus provide a method and apparatus for accurately determining a coordinate of an antenna relative to a fixed reference.

Figure 3:
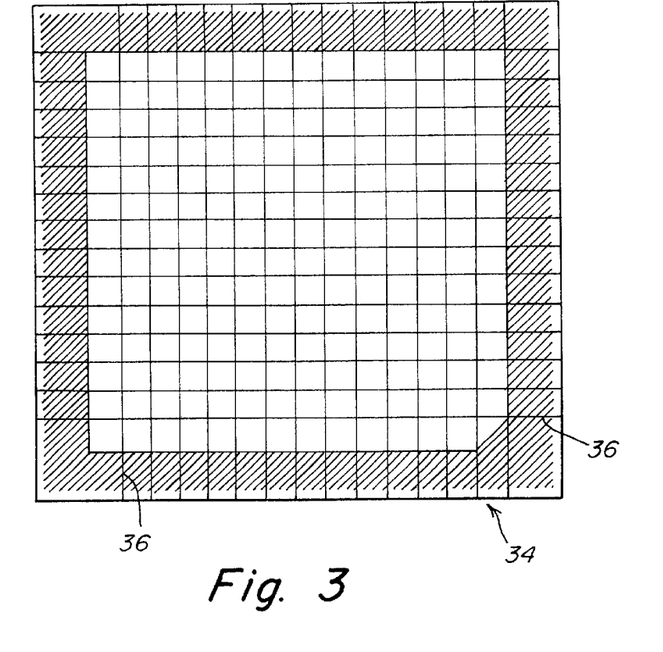
FIG. 3 is an example of a grid used for data collection.

Referring to FIG. 3, there is illustrated a grid 34 that may be used to demarcate profile lines for collecting data over an area, to establish a positional reference for a data collection and imaging system. The antennas may be moved over the grid along the grid lines 36, each single traversal of the grid by the antennas corresponding to a single profile line of the data. The antennas may be moved both horizontally and vertically across the grid to provide data from which there may be created a three-dimensional image of the underlying surface. Typically, the profile lines may be approximately parallel, but may run in any direction across the area.

Figure 4:
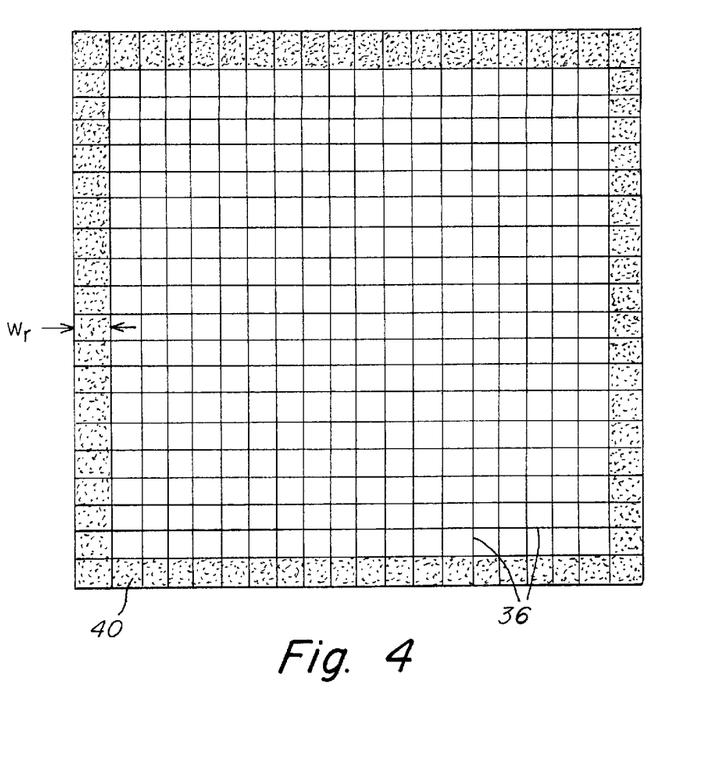
FIG. 4 is an illustration of a grid and reflective strip used to determine coordinates of the antennas.

Referring to FIG. 4, there is illustrated a grid structure including a reflective strip 40 that is combined with the grid and used to accurately position the antennas on the grid. The reflective strip 40 may be metallic, or may be any other material that is highly reflective to the signal radiated by the transmitting antenna and provides a large reflected signal 30 (see FIG. 1). The transmitting antenna transmits a signal 26 that is reflected by the reflective strip 40 and travels back to the antenna module as reflected signal 30. At least a portion of reflected signal 30 is received by the receiving antenna. The antennas may typically be oriented relative to the reflective strip such that a reference line extending between the transmitting antenna and the receiving antenna is perpendicular to a length of the reflective strip 40. Thus, the transmitting antenna travels across the width $w_r$ of the reflective strip 40 followed by the receiving antenna. When a midpoint c between the transmitting and receiving antennas (referring to FIG. 2) is centered over the reflective strip, a maximum reflected signal 30 may be received by the receiving antenna. The controller may process the signals received by the receiving antenna to provide radar data for a particular scan. A large reflection corresponding to the maximum received reflected signal 30 may be easily located in the radar data. The reflective strip 40 may be chosen to be wide enough to ensure that when a midpoint between the transmit antenna and the receiving antenna is centered over reflective strip 40, the strip effectively masks the influence of the medium below the strip. Thus, any reflected signal that may be received from the underlying medium is significantly smaller than the reflection from the reflective strip and may be ignored during signal processing. For example, if the center-to-center spacing between the transmitting and receiving antennas is approximately 6 cm, the width $w_r$ of the reflective strip 40 may be approximately 5 cm. Since the reflective strip is in a predetermined position on the grid, the reflection may be used as a reliable indicator of the start or end of a profile line, and provides a way of accurately determining the position of the antennas in one dimension, for example, the x-dimension.

According to another example, a single antenna may be provided that serves as both the transmitting and receiving antennas. In this example, the width $w_r$ of the reflective strip may be chosen to be less than or equal to the width of the antenna elements so as to effectively mask the underlying surface and provide an easily recognizable reflection when the antenna is centered over the reflective strip. The antenna may be considered to be centered over the reflective strip when a maximum of a main radiation beam of the antenna is centered over the reflective strip. This maximum corresponds to the midpoint c between the two antennas described in the previous example.

In one example, the grid may be many meters in size (in either or both length or width) and may be used to survey large areas of land, or large structures, such as bridges. In this example, there may be additional reflective strips provided at intermediate points along the grid between the start and end of a profile line. Having one or more intermediate reflective strips may be particularly advantageous when a large area is being surveyed. There is a need to maintain the parallelism of the strips over the large area, thus it may be useful to combine the reflective strips with, for example, an optical positioning device or system, as described infra.

Figure 5:
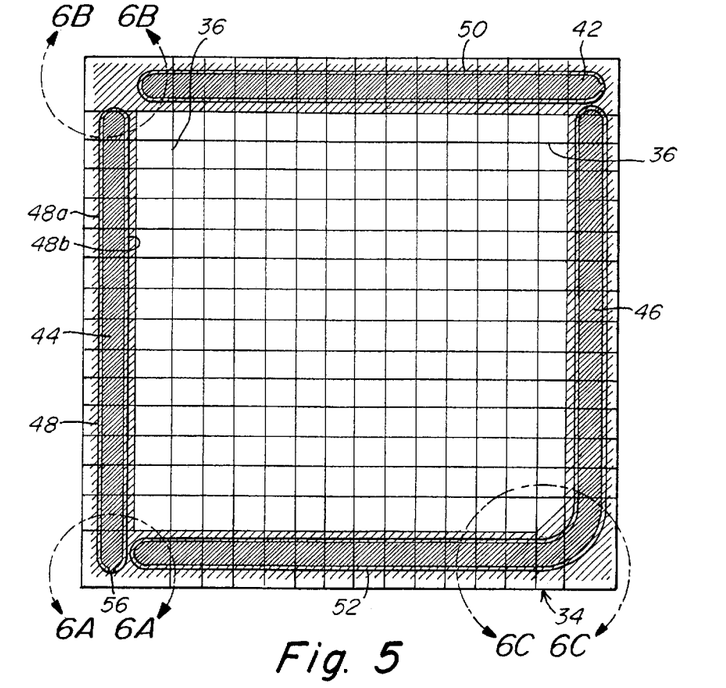
FIG. 5 is an illustration of reflective and conductive strips used to determine coordinates of the antennas.
Figure 6A:
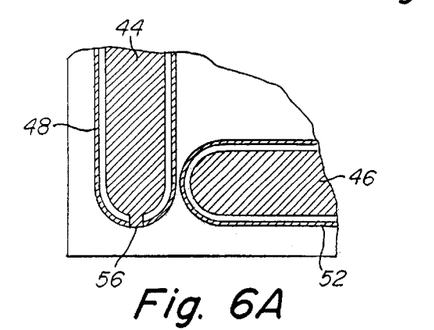
FIG. 6A is a more detailed illustration of a corner of the reflective and conductive strips encircled by arrows 6A—6A of FIG. 5.
Figure 6B:
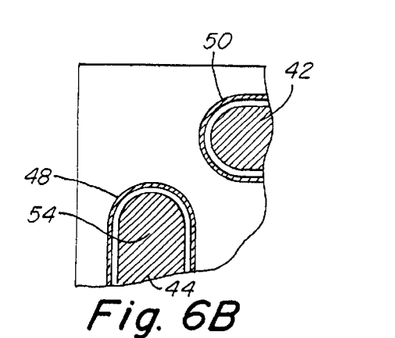
FIG. 6B is a detailed illustration of another corner of the reflective and conductive strips encircled by arrow 6B—6B of FIG. 5.
Figure 6C:
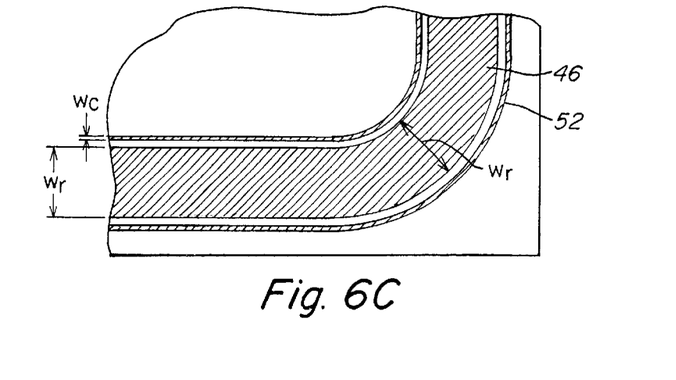
FIG. 6C is an enlarged view of a portion of the reflective and conductive strips encircled by arrow 6C—6C of FIG. 5, illustrating widths of the strips.

According to another embodiment, illustrated in FIG. 5, the grid 34 may be combined with a structure including reflective strips 42, 44, 46 and thin conductive strips 48, 50, 52, substantially surrounding the reflective strips. The structure includes two reflective strips 42, 44, located on first and second sides of the grid, and a third reflective strip 46 that is longer than the first and second reflective strips and is located along opposing sides of the grid. FIG. 6A is an enlarged view of a corner of the grid, illustrating the reflective and conductive strips. For purposes of the following discussion, the reflective strip 44 surrounded by conductive strip 48 will be referred to, and the antennas will be assumed to be moving across the grid in a horizontal direction. However, it is to be appreciated that the discussion also holds true for reflective strip 42 and conductive strip 50 when the antennas are moving across the grid in the vertical direction. Although conductive strip 48 as illustrated is a single strip that substantially surrounds reflective strip 44, conductive strip 48 may be considered as two parallel conductive strips 48a,b on either side of the reflective strip 44. The spacing between the two parallel thin strips, for example, may be approximately equal to the center-to-center spacing between the transmitting and receiving antennas. When the transmitting antenna is centered over one thin strip 48b, a voltage pulse is induced on thin strip 48b by a signal transmitted by the transmitting antenna. The voltage pulse travels along thin strip 48b and back along thin strip 48a. When the pulse arrives beneath the receiving antenna 14, a portion of the pulse is received by the receiving antenna and may be recorded by control unit 16. The delay in travel time of the pulse relative to the arrival time of the surface reflection of the reflective strip 44 is proportional to the distance of the antenna from the top of strip 54, shown in FIG. 6B. The travel time of the pulse may be utilized by the controller to determine accurately a location of the antenna in a second dimension, for example the y-dimension. The thin conductive strips may be metal conductors, or may be any material that is highly conductive and will not retard the voltage pulse so that the travel time of the pulse may be measured accurately. The widths $w_c$ of the thin conductive strips is not critical. However, they should not be so wide as to affect the propagation of the voltage pulse. FIG. 6C is an enlarged view of a portion of the reflective and conductive strips, illustrating the widths. A lossy terminator 56, such as, for example, a resistive film, may be placed on one end of the reflective and conductive strips to severely attenuate any induced voltage pulse propagating in a "reverse" direction. The control unit 16 may be provided with information, such as a known length of conductive strip 48, and thus a known maximum time period within which the pulse is expected to be received by receiving antenna 14. The control unit may set a time range based on this information, and be programmed to consider a signal that is received during the time range to be a valid pulse signal, and to ignore signals received outside the time range. The longer reflective 46 and conductive strips 52 may therefore be made long enough that any pulse excited on these strips is delayed beyond the time range set by the control unit, and therefore may not be measured or processed.

According to another embodiment, a single antenna may be provided that may function as both the receiving and transmitting antennas in the method and apparatus described above. A single antenna may be utilized provided the transmit pulse is short (so that the transmit pulse and reflections from shallow reflectors will not interfere with each other), and provided care is taken to prevent the transmit pulse from saturating the receiver so as to interfere with the ability to detect the received reflections.

According to yet another embodiment, travel time of the pulse along the conductive strips may also be used to estimate a propagation constant of the medium below the strips. The travel time of the pulse is typically influenced by the distance of the antenna from the end of the strip 44, the propagation constant of the conductive strips, and the propagation constant of the underlying medium. This is because typically the electric field generated by a signal on a conductor is not confined entirely to the conductor, but extends a certain distance into the mediums below and above the conductor. Since, in this example, the medium above the conductive strip is air, it does not influence the travel time of the pulse. The medium below the conductive strip, however, will have some effect on the electric field of the pulse, and thus the travel time of the pulse. The travel time of the pulse may be averaged over a number of profile lines of data, and the average used to make an estimate of the propagation constant of the medium.

Figure 7:
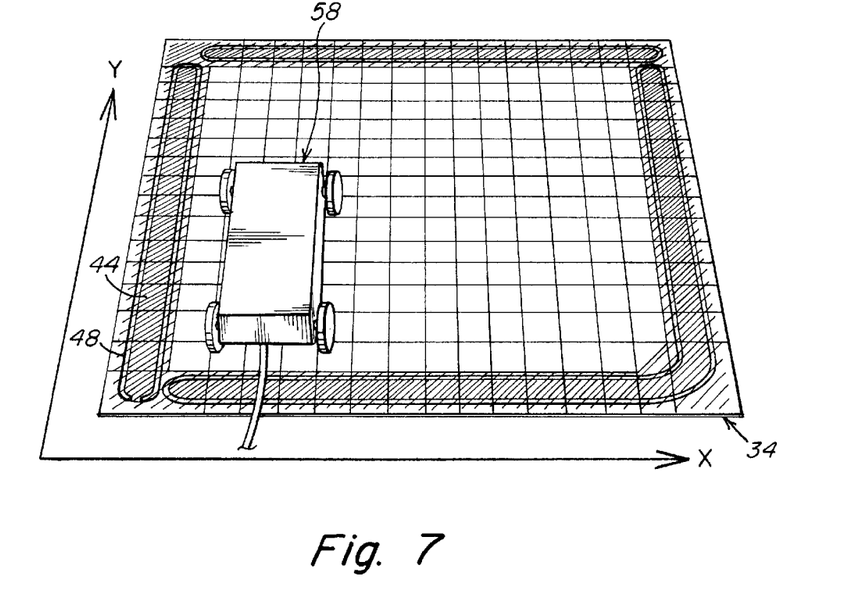
FIG. 7 illustrates a typical data collection strategy.

FIG. 7 illustrates an example of a data collection strategy using the reflective and conductive strips on a grid. The antennas may be mounted on a movable structure, for example, a cart 58, and are moved in the x or y directions over the grid. The cart may be moved manually, for example, may be towed by a person or animal (e.g., a horse), or the cart may be a motorized vehicle. A distance along a data collection path (profile line) may be determined by recording a starting point (e.g., indicated by the signal received from the reflection strip) and determining the distance traveled along the path. For example, a distance encoder may be mounted on the cart and coupled to the controller to measure the distance traveled by the cart. The controller may utilize distance information received from the distance encoder to collect scans of data at evenly spaced distance increments. For example, the controller may receive an indication from the distance encoder that the cart has moved by a certain amount. The controller may, upon receipt of this indication, send a signal to the transmitting antenna to cause the transmitting antenna to transmit the pulse 22. Typically, a number of profile lines of data are obtained in the x direction (i.e., parallel profile lines) at evenly spaced intervals, and then a same number of lines of data are obtained along the y-direction with the same interval spacing. The distance encoder may be any suitable mechanism, such as a meter wheel, shaft encoder, or optical distance measurer.

According to another embodiment, an optical device or system may be used in combination with or instead of the reflective and conductive strips to establish the position of the antenna(s), and/or to maintain an approximately straight collection path. For example, one or more laser beacons may be placed at predetermined locations, either within or without an area to be surveyed. Suitable detectors may be provided on the antenna cart. Using optical triangulation, time differences etc., the position of the cart, and thus the antennas, may be computed using signals received from the beacons. Of course, it may be necessary that the antenna position be ascertainable to within centimeter-level resolution if accurate subsurface (including near-surface) mapping and modeling are to be done. Based solely on time and related constraints discussed herein, an antenna coordinate determination module may utilize the reflective and conductive strips, a laser or other optical surveying mechanism, some combination thereof, or some other mechanism serving the same purpose.

Figure 8:
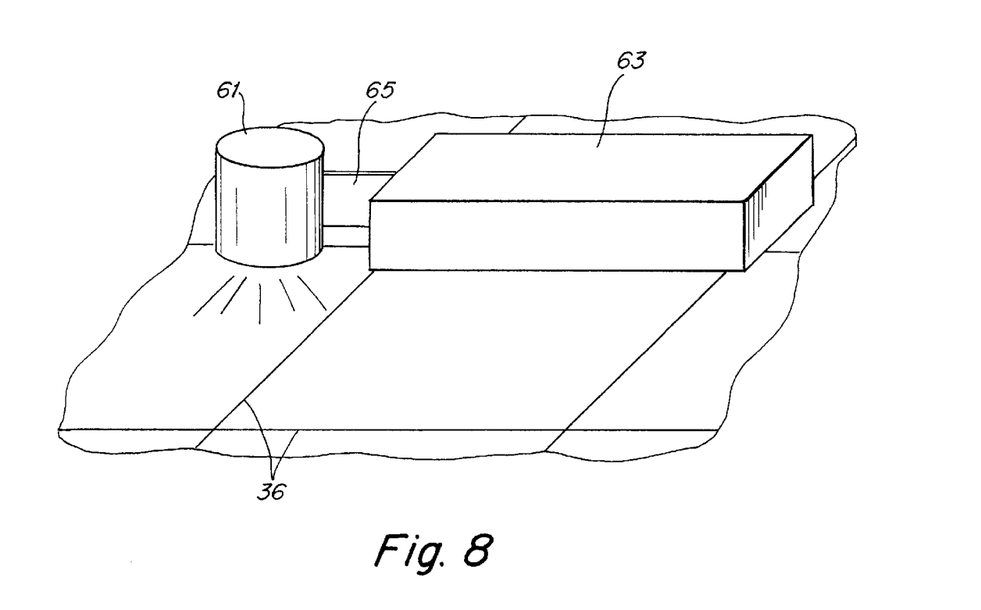
FIG. 8 is a block diagram of an optical sensor mounted proximate the antennas.

For example, the optical system may include optical sensors 61 located on the antenna cart. The optical sensors may detect changes in the optical characteristics of the surface being surveyed, which may allow the controller to determine the location of the antennas. Referring to FIG. 8, the optical sensors 61 may be mounted proximate the antennas 63 using a mounting bracket 65. A grid may be laid over the surface being surveyed, and the optical sensors 61 may be used to detect the grid lines 36. Provided that the location of the antennas 63 relative to the optical sensors is known (e.g., the length and position of the mounting bracket 65 is known), the controller may determined the position of the antennas 63 based on signals received from the optical sensors 61 as they pass over the grid lines 36. According to another example, the optical sensors 61 may include an optical scanning device. A thin strip of material, which may have intermittent reflective and non-reflective surface portions, may be placed over the area being surveyed along an approximately parallel path to the desired collection path. The optical scanning device may direct a light beam towards the thin strip as the antenna unit is moving along the data collection path. The scanning device may detect reflections from the thin strip and send corresponding signals to the controller. The controller may then determine whether the antenna unit is travelling in an approximately straight line. The controller may also use information from the optical scanning device to determine when to activate the transmit antenna to transmit the pulse signal.

Figure 9:
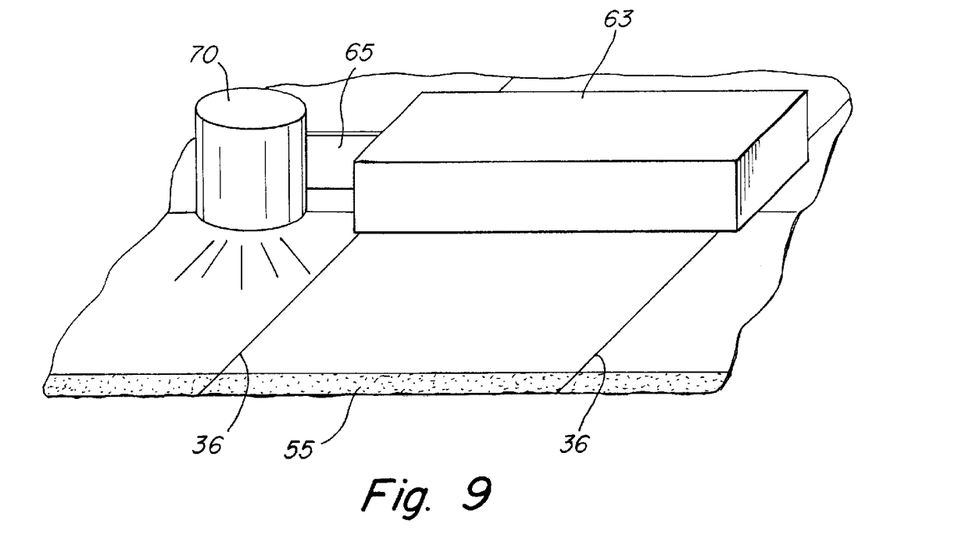
FIG. 9 is a block diagram illustrating a magnetic sensing assembly.
Figure 10:
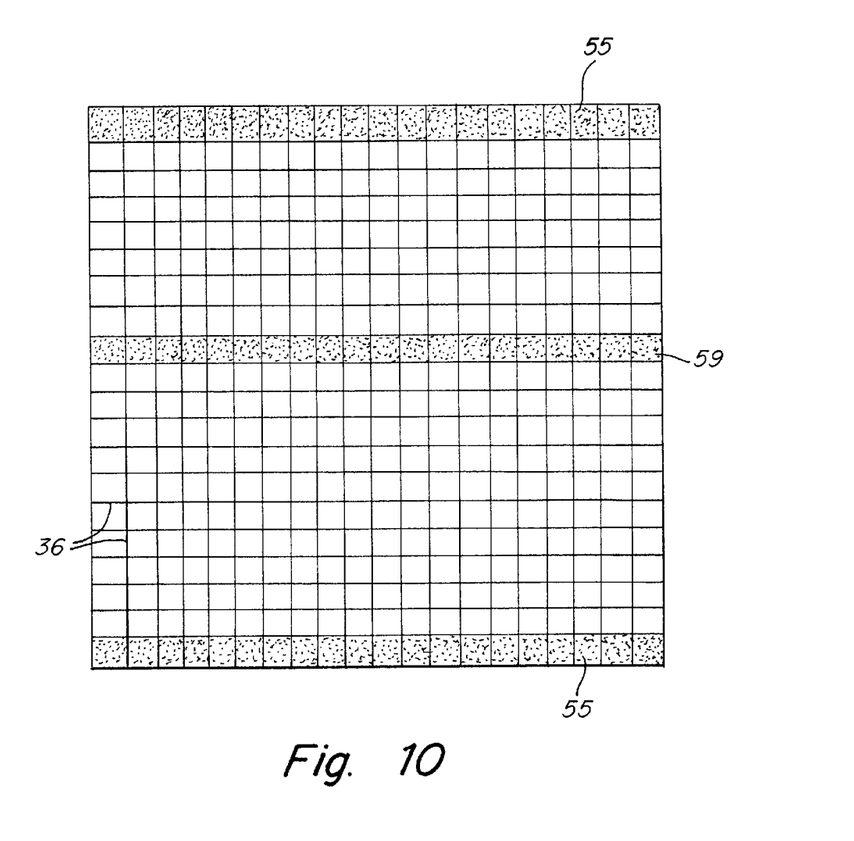
FIG. 10 is an example of magnetic sensing devices deployed in an area to be surveyed.

According to another example, the antenna coordinate determination module may include a magnetic sensing assembly that may be used in combination with a grid. Referring to FIG. 9, the magnetic sensing assembly may include, for example, magnetic sensors 70 (such as Hall-effect devices) located proximate to the antennas on the cart, and magnetic strips 55, or some other magnetic device placed at, for example, the boundaries of the area to be surveyed, as shown in FIG. 10. The magnetic sensing assembly may act as a limit switch; i.e., the magnetic sensors may detect a pulse signal as they pass over the magnetic strips 55, which may indicate to the controller that a boundary has been reached. In this configuration, the magnetic sensing assembly may operate in a manner similar to the reflective strips, providing an indication of the start and end of a profile line. A survey wheel, or optical device may be used to determine a position of the antenna along the grid lines 36. Alternatively, if the area to be surveyed is very large, additional magnetic strips 59, or other magnetic devices, may be placed at predetermined locations, such as at a longitudinal center of the area, throughout the area to be surveyed. The magnetic sensors 70 may emit a pulse or other signal each time they pass over one of these magnetic strips 59. The controller may then determine a position of the antennas 63 based on the predetermined locations of the magnetic strips 55 and known distance between the magnetic sensors 70 and the antennas 63. The magnetic sensors 70 may be mounted to the antennas 63 or antenna cart in any conventional way, such as using a mounting bracket, as described above in reference to the optical sensors, or by gluing.

Any of the optical and/or magnetic sensing assembly embodiments described above may be used in conjunction with the reflective and conductive strips as secondary or complementary positioning systems.

Figure 11:
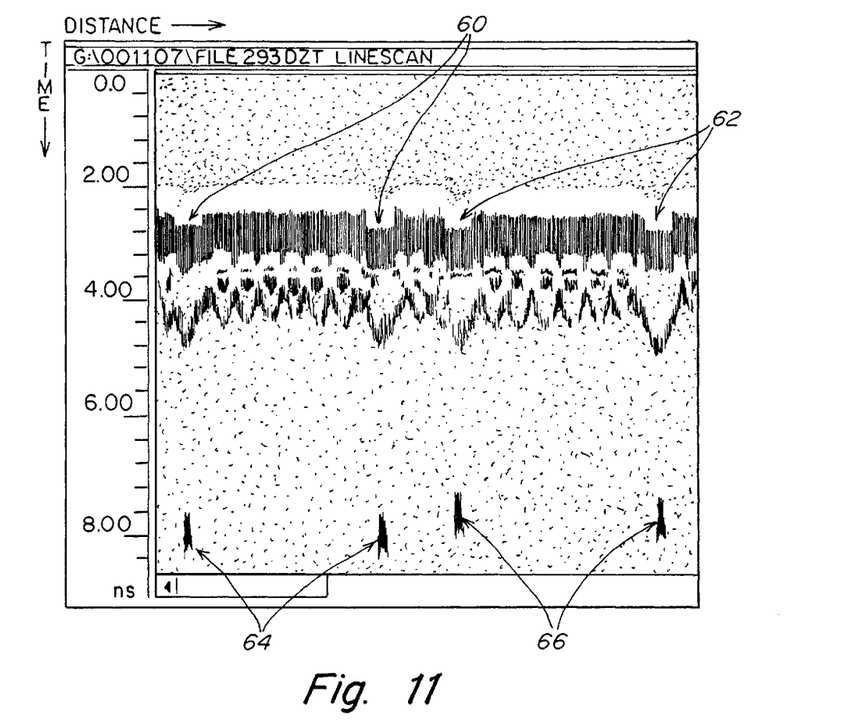
FIG. 11 is a time versus distance plot of two profile lines of radar data.

FIG. 11 illustrates an example of data obtained from two parallel profile lines collected over the grid using the reflective and conductive strips described above. The large reflections 60, 62 near the top of the scan, correspond to the reflections from the wide reflective strips. The reflections are easily and automatically located during data post processing, and may be used to demarcate the starting and ending locations of the profile line for example, in the x-dimension. The dark reflections 64, 66, located lower in the scan because they arrive later in time, correspond to the signals received by the receiving antenna due to the voltage pulse induced on the conductive strip by the transmitting antenna. The difference in arrival time of the strip reflections between two profile lines represents a difference in the y-coordinate of the antenna between the profile lines. Computer algorithms may be easily written to locate the successive strip reflections 64, 66 and use their relative arrival times to calculate the y coordinate of the profile lines, and to correct for any skew in the data caused by a shift in the y-dimension of the antenna.

Figure 12:
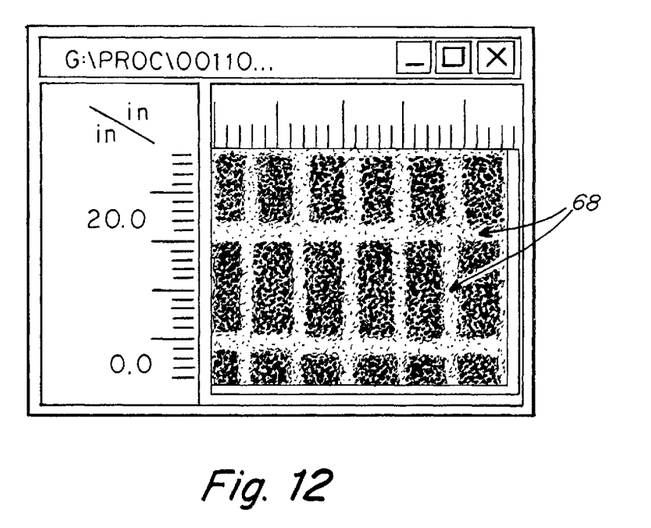
FIG. 12 is a constant depth slice image obtained after processing of the radar data.

FIG. 12 is an example of an image that may be obtained following post-processing of the data of FIG. 11 collected over a new bridge deck surface containing carbon fiber reinforced polymeric grids. The strip reflections have been used to demarcate starting and ending points of profile lines, and are removed from the processed data. The grid layout 68 of the bridge deck surface is clearly shown in the image.

The foregoing description directed toward particular embodiments and aspects thereof, is intended for purposes of illustration and explanation. Various modifications and alterations may be apparent to one of skill in the art and are intended to be covered by this disclosure. For example, the coordinates of the antenna are described above in terms of (x,y) Cartesian coordinates. However, this is merely one example, and the apparatus and methods disclosed herein may be used to determine coordinates of an antenna using any coordinate system as desired, and are not limited to (x,y) coordinates. The scope of the invention should be determined from proper construction of the appended claims and their equivalents.

What is claimed is:

1. A method for determining a coordinate of an antenna relative to a predetermined reference, the method comprising acts of:

placing transmitting and receiving antennas in proximity to a reflective strip;

transmitting a first signal from the transmitting antenna;

detecting a reflection of the first signal received by the receiving antenna from the reflective strip;

determining a coordinate of at least one of the receiving antenna and the transmitting antenna relative to the reflective strip based on a parameter of the reflection.

2. The method as claimed in claim 1, wherein placing transmitting and receiving antennas in proximity to a reflective strip includes placing a single antenna that performs both a transmitting and receiving function in proximity to the reflective strip.

3. The method as claimed in claim 1, further comprising acts of:

detecting a second signal received by the receiving antenna from a conductive strip located proximate to the reflective strip;

determining a second coordinate of at least one of the receiving antenna and the transmitting antenna based at least on a time difference between transmitting the first signal from the transmitting antenna and receiving the second signal at the receiving antenna.

4. The method as claimed in claim 3, further comprising acts of:

determining an average time difference between transmitting the first signal from the transmitting antenna and receiving the second signal at the receiving antenna over a plurality of scans; and determining a propagation constant of a medium below the conductive strip based at least in part on the average time difference.

5. The method as claimed in claim 1, further comprising acts of:

placing optical beacons at a plurality of predetermined locations;

detecting signals from the optical beacons with optical detectors located proximate to at least one of the transmitting and receiving antennas; and determining a coordinate of at least one of the transmitting and receiving antennas based on a time difference between the optical signals detected by the optical detectors.

6. The method as claimed in claim 1, further comprising acts of:

providing a grid overlaying a surface to be surveyed;

receiving an optical signal from an optical sensor, located proximate to at least one of the transmitting and receiving antennas, when the optical sensor passes over a grid line of the grid; and determining a position of at least one of the transmitting and receiving antennas based on reception of the optical signal.

7. The method as claimed in claim 1, further comprising acts placing a plurality of magnetic devices at predetermined locations within an area to be surveyed;

providing a magnetic sensor located proximate to at least one of the transmitting and receiving antennas;

receiving a signal from the magnetic sensor when the magnetic sensor passes near one of the plurality of magnetic devices; and determining a position of at least one of the transmitting and receiving antennas based on reception of the signal.

8. A method for determining a coordinate pair of an antenna location relative to a predetermined reference, the method comprising acts of:
- placing the antenna proximate to a structure including first and second conductive strips located on either side of a reflective strip;
- transmitting a first signal from the antenna;
- measuring at least one parameter of a second signal received by the antenna, the second signal corresponding to a reflection of the first signal by the reflective strip;
- transmitting a third signal from the antenna to the first conductive strip;
- measuring at least one parameter of the third signal received by the antenna from the second conductive strip;
- determining a first coordinate of the antenna based on a measurement of the at least one parameter of the second signal; and
- determining a second coordinate of the antenna based on a measurement of the at least one parameter of the third signal.

9. The method as claimed in claim 8, wherein the act of measuring at least one parameter of the third signal includes measuring a time difference between a time of transmission of the third signal and a time of reception by the antenna of the third signal.

10. The method as claimed in claim 8, wherein the first and second conductive strips are joined.

11. The method as claimed in claim 8, further comprising acts of:
- placing optical beacons at a plurality of predetermined locations;
- detecting signals from the optical beacons with optical detectors located proximate to at least one of the transmitting and receiving antennas; and
- determining a coordinate of at least one of the transmitting and receiving antennas based on a time difference between the optical signals detected by the optical detectors.

12. The method as claimed in claim 8, further comprising acts of:
- providing a grid overlaying a surface to be surveyed;
- receiving an optical signal from an optical sensor, located proximate to at least one of the transmitting and receiving antennas, when the optical sensor passes over a grid line of the grid; and
- determining a position of at least one of the transmitting and receiving antennas based on reception of the optical signal.

13. The method as claimed in claim 8, further comprising acts of:
- placing a plurality of magnetic devices at predetermined locations within an area to be surveyed;
- providing a magnetic sensor located proximate to at least one of the transmitting and receiving antennas;
- receiving a signal from the magnetic sensor when the magnetic sensor passes near one of the plurality of magnetic devices; and
- determining a position of at least one of the transmitting and receiving antennas based on reception of the signal.

14. An apparatus for determining a coordinate of an antenna relative to a predetermined reference, the apparatus comprising:
- a transmitting antenna that transmits a signal;
- a reflective strip that reflects at least a portion of the signal transmitted by the transmitting antenna;
- a receiving antenna that receives a reflected signal from the reflective strip;
- a controller, coupled to the receiving antenna, that measures at least one parameter of the reflected signal and determines the coordinate of at least one of the transmitting antenna and the receiving antenna based on a measurement of the parameter.

15. The apparatus as claimed in claim 14, further comprising:
- a plurality of optical beacons, disposed at predetermined locations, that transmit optical signals;
- at least one optical detector, located proximate to at least one of the transmitting antenna and the receiving antenna and coupled to the controller, that detects the optical signals from the plurality of optical beacons;
- wherein the controller determines the coordinate of at least one of the transmitting antenna and the receiving antenna based on the optical signals detected by the at least one optical detector.

16. The apparatus as claimed in claim 14, further comprising:
- a conductive strip substantially surrounding the reflective strip;
- wherein the controller is adapted to measure at least one parameter of a second signal received from conductive strip by the receiving antenna, the second signal corresponding to at least a portion of the signal transmitted by the transmitting antenna that travels along the conductive strip; and
- wherein the controller is adapted to determine a second coordinate of at least one of the transmitting antenna and the receiving antenna based on a measurement of the at least one parameter of a second signal.

17. The apparatus as claimed in claim 16, wherein the coordinate is a Cartesian coordinate.

18. The apparatus as claimed in claim 16, further comprising:
- a plurality of optical beacons, disposed at predetermined locations, that transmit optical signals;
- at least one optical detector, located proximate to at least one of the transmitting antenna and the receiving antenna and coupled to the controller, that detects the optical signals from the plurality of optical beacons; and
- wherein the controller determines the coordinate of at least one of the transmitting antenna and the receiving antenna based on the optical signals detected by the at least one optical detector.

19. The apparatus as claimed in claim 16, further comprising:
- at least one optical sensor located proximate to at least one of the transmitting antenna and the receiving antenna and coupled to the controller, the at least one optical sensor providing a signal to the controller based on optical characteristics of a surface being surveyed;
- wherein the controller determines a position of at least one of the transmitting antenna and the receiving antenna based on the signal from the optical sensor.

20. A system that provides an image of a subsurface area, the system comprising:
- a control unit;

an antenna, coupled to the control unit, that transmits signals into a medium and receives reflected signals from the medium, the antenna being moved over the area in parallel lines to provide scans of radar data of the area; and a reflective strip that reflects at least a portion of a signal transmitted by the antenna to provide a reflected signal;

wherein the control unit utilizes at least a portion of the reflected signal received by the antenna to provide an accurate position of the antenna in one dimension, the position being used to align successive scans of radar data to provide the image.

21. The system as claimed in claim 20, further including a conductive strip, wherein:

the antenna transmits a signal that propagates on the conductive strip, a portion of the signal being received by the antenna after a time interval; and the control unit is adapted to determine a position of the antenna in a second dimension based on the time interval.

22. A system that provides an image of a subsurface area, the system comprising:

a control unit;

an antenna, coupled to the control unit, that transmits signals into a medium and receives reflected signals from the medium, the antenna being moved over the area in parallel lines to provide scans of radar data of the area; and means for determining accurately a position of the antenna relative to a predetermined reference location, comprising a magnetic sensing assembly including a plurality of magnetic devices disposed at predetermined locations in the area, and at least one magnetic sensor located proximate to the antenna, that detects the magnetic devices; wherein the at least one magnetic sensors provides a signal to the control unit, indicating detection of one of the plurality of magnetic devices, and wherein the control unit determines a position of the antenna based on the signal provided by the at least one magnetic sensor.

23. A system that provides an image of a subsurface area, the system comprising;

a control unit;

an antenna, coupled to the control unit, that transmits signals into a medium and receives reflected signals from the medium, the antenna being moved over the area in parallel lines to provide scans of radar data of the area; and means for determining accurately a position of the antenna relative to a predetermined reference location, comprising an optical sensing assembly including at least one optical sensor located proximate to the antenna, the at least one optical sensor providing an optical signal based on optical characteristics of the area;

wherein the control unit determines a position of the antenna based at least in part on the optical signal.

24. A system that provides an image of a subsurface area, the system comprising:

a control unit;

an antenna, coupled to the control unit, that transmits signals into a medium and receives reflected signals from the medium, the antenna being moved over the area in parallel lines to provide scans of radar data of the area; and means for determining accurately a position of the antenna relative to a predetermined reference location, comprising a controller coupled to the antenna, and an optical sensing assembly including a plurality of optical beacons, disposed at predetermined locations in the area, that transmit optical signals; and at least one optical detector, located proximate to the antenna and coupled to the controller, that detects the optical signals from the plurality of optical beacons;

wherein the controller determines the coordinate of the antenna based on the optical signals detected by the at least one optical detector.

25. A system that provides an image of a subsurface area, the system comprising:

a control unit;

an antenna, coupled to the control unit, that transmits signals into a medium and receives reflected signals from the medium, the antenna being moved over the area in parallel lines to provide scans of radar data of the area; and means for determining accurately a position of the antenna relative to a predetermined reference location, comprising a combination of a reflective strip that reflects at least a portion of a signal transmitted by the antenna to provide a reflected signal, wherein the control unit utilizes at least a portion of the reflected signal received by the antenna to provide an accurate position of the antenna in one dimension, the position being used to align successive scans of radar data to provide the image, and at least one of an optical sensing assembly and a magnetic sensing assembly.

* * * * *